United States Patent Office 3,307,287
Patented Mar. 7, 1967

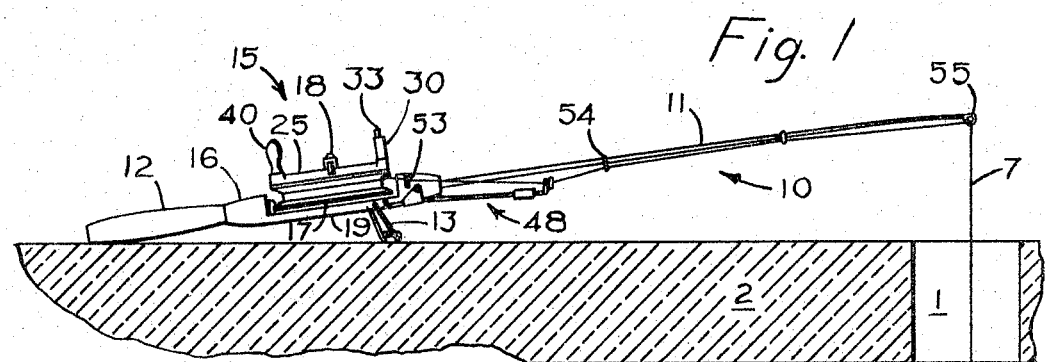
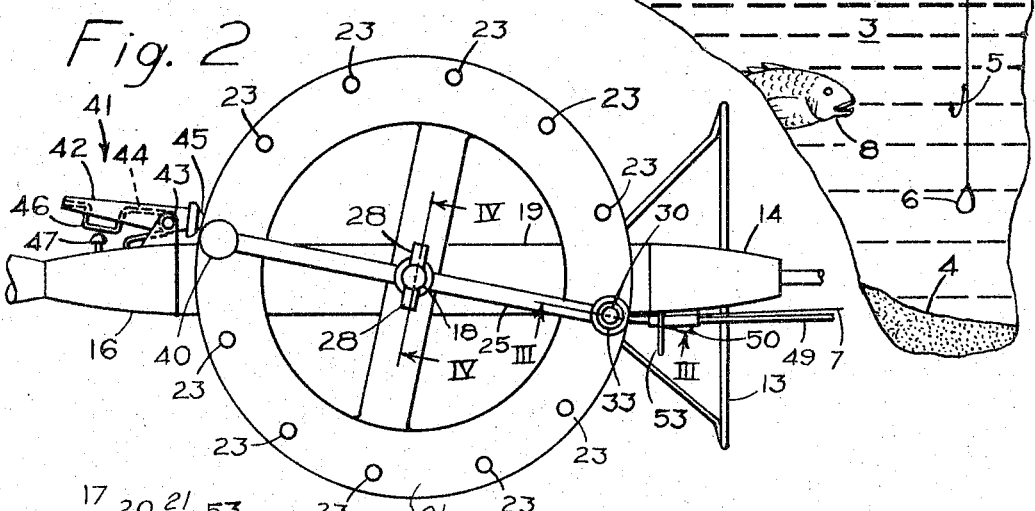
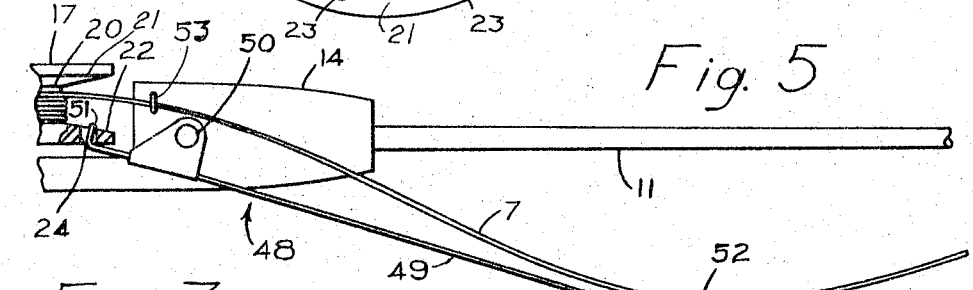
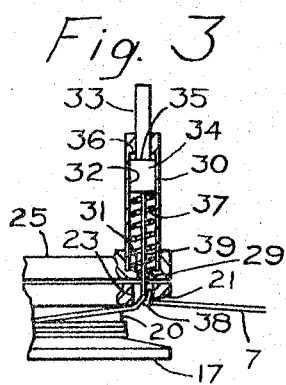
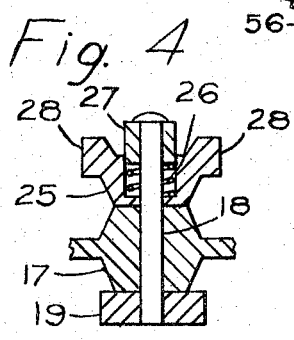
Herman L. Hagen
INVENTOR

3,307,287
FISHING TACKLE
Herman L. Hagen, 420 Madison St.,
Walworth, Wis. 53184
Filed Mar. 5, 1965, Ser. No. 437,475
17 Claims. (Cl. 43—20)

This invention pertains to improvements in fishing tackle and more particularly to reels adapted for use in ice fishing.

Ice fishing is a winter sport whereby fish may be caught in ice covered bodies of water. A hole is cut through the ice to permit a baited hook attached to a fishline to be dropped into the water. A sinker, also fastened to the line, pulls the baited hook down as far as the fisherman permits the line to go or until the sinker rests on the bottom. Sometimes a fisherman finds it desirable to fish at one depth and at other times at a different depth, or he may decide to fish at a certain distance above the bottom. A fisherman may hold the line in his hand and so control the depth of the hook as well as feeling a tug when a fish bites. Such a method is confining and generally unsatisfactory in cold weather. A more comfortable method of fishing employs a fishing rod supported so that the butt end or handle rests on the ice, while the tip end, from which the line is suspended, is elevated by a support intermediate the ends so that the hooking of a fish is signalled by movement of the tip of the rod, which may ring a bell or otherwise call attention to the presence of a fish.

Regardless of the fishing method used, the dropping of the hook repeatedly to the same depth presents a problem. Assuming that a rod is used, the line may be tied directly to the rod, assuring that the hook will be at the same depth every time. But whenever the fisherman desires to change the depth at which he is fishing, the line must be untied and then retied at a different length. This would be all but impossible when wearing gloves and uncomfortable without gloves. If an ordinary reel is employed, it is easy to change the depth of the hook, but not easy to drop the hook repeatedly to the same depth. Counting the number of revolutions of the reel as the line is drawn in and then payed out is one method that could be adopted, but forgetting the desired number of turns or miscounting is prevalent and in any event some unnecessary effort is required. My invention overcomes these difficulties.

It is an object of this invention to permit rapid and easy adjustment of the length of line repeatedly payed out by a fishing reel.

Another object is to provide fishing tackle that will repeatedly pay out any selected length of line from a reel.

It is a particular object of this invention to make easy the selection of the length of line payed out in order to fish at a given distance above the bottom of the body of water.

A further object is to provide a novel brake for a fishing reel.

Still another object is to provide a novel construction for fishing tackle to accomplish the intended purpose.

Details of a preferred embodiment of my invention are shown in the drawings of which:

FIG. 1 is an elevation partially in section of the fishing tackle in use with the brake disengaged.

FIG. 2 is a plan view of the reel and associated parts of the fishing tackle.

FIG. 3 is a view partially taken in section along the line III—III of FIG. 2.

FIG. 4 is a sectional view taken along the line IV—IV of FIG. 2.

FIG. 5 is an elevation of the brake in engaged position.

When ice fishing, as shown in FIG. 1, a hole 1 is cut through the ice 2 covering a body of water 3, having a bottom 4. The hole permits the baited hook 5 and sinker 6, both fastened to line 7 to be dropped into the water. The sinker 6 pulls the hook 5 downward to the extent permitted by line 7 or until the sinker rests upon the bottom 4. If a fish 8 is caught on hook 5, it is pulled from the water through the hole in the ice cover by means of the line 7. The line 7 is payed out, held, and reeled in by the fishing tackle 10, which incorporates my invention. A rod 11 is supported in cantilever fashion by a tripod comprising a handle 12 and a support 13. The rod 11 is usually light, flexible and resilient, being made of fibre glass, steel or any other suitable material. It is rigidly fastened to one end 14 of a reel assembly 15, the other end 16 of which is rigidly joined to the handle 12, preferably made of wood or some other suitable material having a low rate of heat conduction.

A spool 17, to which one end of line 7 is fastened, turns freely on a stud pivot 18, affixed intermediate the ends 14 and 16 to a connecting portion 19. The spool 17 has a line retaining cylindrical portion 20, upon which line 7 may be wound between upper and lower radial flanges 21 and 22, respectively. The upper flange 21 has a series of equally spaced perforations 23 extending axially therethrough equidistant from the pivot 18 for a purpose to be described. The lower flange 22 has similar perforations 24, the use of which will be subsequently explained. A member 25, referred to herein as a bar, is mounted above the spool 17 on pivot 18, about which it rotates freely and upon which it may be moved axially. A spring 26, acting between a head 27 on the free end of pivot 18 and the bar 25, biases the latter toward spool 17 and limits the axial motion of the bar. A pair of ears 28 is provided on bar 25 adjacent the pivot 18 to make it easier to grasp the bar with gloved hands, to move it axially against its bias and to rotate it as will be explained later. An axial hole 29 through the bar 25 at the same radius as the perforations 23 is counterbored at the outer end to receive a press fit bushing 30 and to provide an annular stop 31. The bushing 30 has a stepped bore therethrough with the larger diameter bore 32, at the lower end, being larger than hole 29. A plunger 33 reciprocable in the bushing 30 has an enlarged inner end 34, having a sliding fit in the larger bore 32 and terminating in a shoulder 35 engageable with step 36 in the bore 32. A compression spring 37, acting between the stop 31 and plunger 33, biases the plunger outwardly toward a limiting position defined by shoulder 35 and step 36. A hook-shaped grapple 38 has an elongated shank 39 rigidly embedded in plunger 33 so that the grapple is reciprocable with the plunger. The grapple 38 is of such size that it will pass through any of the perforations 23 with which it may be aligned by lifting the bar 25, as by ears 28, against the bias of spring 26 until grapple 38 clears the flange 21 and rotating the bar relative to spool 17. When the bar 25 is released, grapple 38 will extend into the aligned perforation 23, coupling the spool 17 to bar 25 so that bar 25 and spool 17 will rotate as a unit when the bar is turned on its pivot 18, as by knob 40. With the bar 25 and spool 17 so engaged, grapple 38 in the limiting position established by the shoulder 35 and step 36 extends into the perforation 23, but does not extend below the flange 21 so as to interfere with the reeling in or paying out of the line 7. When the plunger 33 is depressed, grapple 38 is extended below flange 21 so it may catch the line 7 as it feeds off of the cylindrical portion 20 of spool 17. Upon release of the plunger 33, grapple 38 will be retracted by spring 36 until the line is secured between the grapple 38 and the flange 21, as shown in FIG. 3.

A manually released brake 41 comprises an arm 42, pivoted at fulcrum 43 and biased by torque spring 44 to press a piece of friction material 45 against the rim of spool 17. The manual brake may be latched out of engagement with spool 17 by means of a formed portion 46 of the torque spring 44 adapted to be snapped over a headed projection 47 on end 16. Arm 42 is so shaped that friction material 45 engages the rim of spool 17 slightly to that side of a line between pivot 18 and fulcrum 43 from which the spool 17 approaches the brake as line 7 is payed out, so that, when the friction material 45 is in engagement with spool 17, the pressure between them increases as the pull on the line increases, resulting in ever greater braking action and, when the line is being reeled in, the pressure of the brake 41 on the spool 17 decreases, permitting the brake to slip. The manual brake 41, therefore, is a unidirectional friction brake.

A second brake 48 is automatically operated by loss of tension in line 7. As best seen in FIG. 5, the brake consists of a light lever 49, pivoted on a pintle 50 upon end 14. The lever has one end 51 that may be moved into and out of any of the perforations 24 as they become aligned, and a second end 52 loosely engaging the line 7. Said second end 52 is heavier than the first end 51 and lever 49 is shaped such that, when line 7 is under tension between guides 53 and 54 (see FIG. 1), the end 51 is restrained from entering any of the perforations 24, but, when line 7 becomes slack, the lever 49 rotates about pintle 50 until the first end 51 moves into contact with flange 22 and enters the next of the perforations 24 to become aligned with it, thus preventing further rotation of spool 17. If necessary, additional weight 56 may be added to the second end 52 to cause lever 49 to rotate when the line 7 becomes slack.

Let us assume that an ice fisherman wishes to fish at a selected distance above the bottom of a body of ice covered water. He drills a hole 1 through the ice 2 at the desired location and sets up his tackle 10, so that it rests upon the ice at the end of handle 12 and the support 13 with the last line guide 55 at the tip of rod 11 positioned above the hole 1. The weight of the sinker 6 on the end of line 7 dangling from guide 55 will hold the line under tension and so prevent operation of brake 48. The spring 44 biases brake 41 to engage spool 17 and the pull on the line 7 by sinker 6 tends to rotate the spool in a direction to make the braking action effective. When the fisherman moves arm 42 to release the brake 41 by moving friction material 45 out of engagement with spool 17, the weight of the sinker 6 pulling on line 7 causes the spool to rotate and pay out more of the line so that the hook 5 and sinker 6 enter the water and fall toward the bottom. During this time the fisherman may hold brake 41 out of contact with spool 17 or he may latch it out of contact by snapping formed portion 46 of spring 44 over head 47, while the pull of sinker 6 maintains tension on line 7 and so prevents brake 48 from interfering with rotation of spool 17. When the sinker 6 hits the bottom 4, tension on line 7 immediately disappears and the line becomes slack. If it were not for the brake 48, rotation of the spool 17 would continue due to its angular momentum, causing the line 7 to be spewed out onto the ice 2, where it would serve no purpose but could become tangled and would in any event have to be wound back onto the spool. With the tackle here described, however, such action does not occur because as soon as the line 7 becomes slack, lever 49 rotates around pintle 50, due to the excess weight of end 52, causing the end 51 to enter the next perforation 24 to become aligned with it and thus preventing further rotation of spool 17. The amount of slack in the line, therefore, cannot exceed the distance between adjacent perforations 24. A side of the perforation 24 serves as an abutment, into the path of which end 51 moves to stop rotation of spool 17. Brake 41 is then unlatched to prevent more of line 7 from being payed out. The fisherman then substracts the spacing between hook 5 and sinker 6 from the distance he desires to fish above the bottom 4 in order to determine how much line to reel in. Raising the rod to lift sinker 6 from the bottom to restore tension to line 7 and move the brake 48 out of engagement with the spool 17, he reels onto spool 17 the amount of line 7 required to lift the hook 5 the desired distance from the bottom 4 by moving the knob 40 around pivot 18, after which brake 41 prevents more of line 7 from being payed out.

In order to assure dropping his hook 5 to the same depth the next and succeeding times, the fisherman grasps the bar 25 as by ears 28 and lifts it against the bias of compression spring 26 until grapple 38 clears flange 21, after which he rotates the bar until the grapple 38 is aligned with that perforation 23 nearest the point where the line 7 clears the spool 17. The bar 25 is then permitted to move downward toward spool 17 under the urging of bias spring 26, allowing the grapple 38 to enter the selected perforation 23, coupling the bar to the spool. Plunger 33 is depressed so that grapple 38 passes through flange 21 and by slight rotation of the spool 17, snags a segment of the line 7 where it leaves the spool. Upon release of plunger 33, spring 37 moves it and the attached grapple 38 upwardly, drawing the segment of line 7 into the perforation 23, where it is securely held between the grapple and the sides of the perforation so that, upon release of the brake 41, no more line can be payed out. When a fish is caught, reeled in and removed from the hook, the tackle is set up again as before, brake 41 is released and latched out of engagement with spool 17, permitting the line 7 to pay out until the grip upon it between grapple 38 and the sides of perforation 23 prevents further pay out. The hook 5 is then at the same depth as before.

It is obvious that alternative constructions could be used to accomplish the same results. It is also obvious that the tackle diclosed could be used for fishing off a pier, or bridge, or for other purposes. It is only necessary that the tackle be supported in a fixed position where the line can be dropped freely into the water at the desired location. The scope of this invention is not limited to the use or preferred embodiment described, but is limited only by the scope of the claims.

I claim as my invention:

1. In a fishing reel, a spool rotatable about a fixed pivot, said spool having a cylindrical portion and an adjacent flange portion, a line attached to said spool and at least partially wound upon the cylindrical portion, a grapple reciprocable through a perforation in said flange portion and adapted to snag a segment of said line as it leaves said spool, and means for biasing said grapple to secure the line against the flange to prevent further unwinding of said line from the spool.

2. A fishing reel according to claim 1 having a plurality of spaced perforations in said flange, said grapple being reciprocable through any of said perforations.

3. A fishing reel according to claim 2 in which said grapple is rotatable about said fixed pivot.

4. A fishing reel comprising a spool rotatable about a fixed pivot, said spool having a cylindrical portion and an adjacent flange, a line attached to said spool and at least partially wound upon the cylindrical portion, a member rotatable about and movable axially on said pivot, a grapple mounted on said member and reciprocable through any aligned one of a plurality of spaced perforations in said flange, and means for moving said grapple to catch a segment of the line and draw it into secure engagement with a portion of said flange to prevent further unwinding of the line from the spool.

5. A fishing reel according to claim 4 having means to bias the grapple axially toward the inner portion of the flange and thereby adapted to secure said segment of line against said flange.

6. A fishing reel according to claim 4 having means for limiting movement of the grapple to assure projection of said grapple from the member into any aligned one of said perforations to couple said member to the spool for joint rotation when the member is moved toward said spool and to provide axial clearance between the grapple and said spool when the member is moved away from said spool to permit relative rotation between said member and said spool.

7. A fishing reel according to claim 6 having means urging the member toward said spool to normally provide coupling of the member to said spool.

8. A fishing tackle comprising a rod, a reel assembly, and a line; said rod rigidly affixed to the reel assembly, a plurality of guides on said rod defining a path for said line along the rod, said reel assembly having a cylindrical portion between upper and lower flange portions defining a spool freely rotatable about a fixed pivot, a plurality of spaced perforations equidistant from the pivot in said upper flange, a plurality of spaced abutments equidistant from the pivot on the outside of said lower flange, a lever movable in a plane perpendicular to said lower flange about a fixed pintle and having a first end adapted to be interposed in the path of said abutments, a second end of said lever in loose operative engagement with said line intermediate an adjacent pair of said guides and adapted to deflect the line from the defined path, said lever biased to deflect said line from the defined path and to interpose the first end in the path of said abutments to stop rotation of the spool, a grapple rotatable about said fixed pivot and reciprocable through any of the perforations, said line attached at one end to said spool and being at least partially wound upon the cylindrical portion of the spool, a portion of said line passing successively and freely through said guides and being in operative engagement with the second end of said lever, a sinker affixed to the free end of said line to provide tension for paying out said line from said spool until said sinker rests in a limiting position, said line under tension provided by said sinker moving said lever out of the path of said abutments to permit said spool to rotate and pay out the line, said line without tension provided by said sinker becoming slack and permitting the lever to stop rotation of the spool and pay out of the line, means for rotating said spool to reel in a portion of said line, said grapple movable through a selected one of said perforations to catch a segment of said line leaving said cylindrical portion and to draw said line into securing engagement with the upper flange to prohibit paying out any of said line wound upon the spool beyond the segment.

9. A fishing tackle according to claim 8 having a manually releasable brake adapted to prevent rotation of the spool.

10. A fishing tackle according to claim 9 with means for latching said brake in released position to permit free rotation of the spool.

11. A fishing tackle according to claim 8 having means for supporting said rod in cantilever fashion.

12. A fishing tackle comprising a rod, a reel assembly, and a line, said rod rigidly affixed to the reel assembly, a plurality of guides on said rod defining a path for said line along the rod, said reel assembly having a cylindrical portion ending in a radially projecting flange comprising a spool freely rotatable about a fixed pivot, an abutment on said flange on other than the side adjacent the cylindrical portion, a lever rotatable about a fixed pintle and having a first end movable in a plane perpendicular to said flange into the path of said abutment, a second end of said lever in operative engagement with said line between an adjacent pair of said guides and adapted to deflect the line from said defined path, said lever biased to deflect said line and to interpose the first end into the path of said abutment to prevent rotation of the spool and further unreeling of the line, said line fastened to and at least partially wound upon the spool before passing through the guides and terminating in a sinker, said sinker providing tension on said line to draw the line from the spool and to hold said lever against its bias out of the path of said abutment.

13. A fishing tackle according to claim 12 having a plurality of spaced abutments equidistant from said pivot, the lever movable into the path of any of said abutments to prevent rotation of said spool.

14. A fishing reel comprising a spool rotatable about a fixed pivot, a line fastened to and at least partially wound on said spool, means including a brake operable upon presence of slack in a portion of said line not wound on the spool to prevent rotation of the spool, said brake comprising a lever having one end engaging said line and the other end movable into engagement with said spool, and means for catching a selectable segment of said line and in cooperation with said spool preventing a portion of the line wound on said spool beyond the segment from being unwound.

15. A fishing reel according to claim 14 in which said lever is movable about a fixed pintle into engagement with an abutment on said spool to stop rotation of the spool.

16. A fishing reel according to claim 14 in which said means for catching comprises a grapple and bias means for urging the grapple toward a portion of said spool, said grapple movable against the bias to catch the segment of line and movable by the bias to pull said segment into restraining engagement with said portion of the spool.

17. In a fishing reel, a spool rotatable about a fixed pivot, said spool comprising a cylindrical portion between upper and lower flange portions, a line attached to said spool and at least partially wound upon the cylindrical portion, means including a brake operable by slack in a portion of said line not wound upon said spool to engage said lower flange to prevent rotation of said spool, said brake comprising a lever having one end engaging said line and the other end movable into engagement with said spool, means for rotating the spool to reel in a portion of said line, and means adapted to snag a segment of said line and secure said segment against the upper flange to prevent a portion of said line wound on the spool beyond the segment from being unwound.

References Cited by the Examiner

UNITED STATES PATENTS

| | | | |
|---|---|---|---|
| 787,055 | 4/1905 | Schreidt | 43—20 X |
| 1,738,204 | 12/1929 | Gualman | 43—20 |
| 2,333,632 | 11/1943 | Benson | 43—20 |
| 2,713,978 | 7/1955 | Daniel | 43—20 X |
| 2,941,748 | 6/1960 | Matthiesen | 242—84.53 X |
| 2,957,264 | 10/1960 | Ruff | 43—20 |

SAMUEL KOREN, *Primary Examiner.*

DANIEL J. LEACH, *Assistant Examiner.*